United States Patent [19]

Barie, Jr. et al.

[11] 4,041,004
[45] Aug. 9, 1977

[54] POLYEPOXY-3,3',4,4'-BENZHYDROL TETRACARBOXYLIC DIANHYDRIDE LAMINATING RESINS

[75] Inventors: Walter P. Barie, Jr., Shaler Township, Allegheny County; Anatoli Onopchenko, Monroeville; Johann G. D. Schulz, Pittsburgh, all of Pa.

[73] Assignee: Gulf Research & Development Company, Pittsburgh, Pa.

[21] Appl. No.: 534,901

[22] Filed: Dec. 20, 1974

[51] Int. Cl.² .................................................. C08K 5/07
[52] U.S. Cl. ........................ 260/32.8 EP; 260/31.2 R; 260/33.6 EP; 260/33.8 EP
[58] Field of Search .................... 260/31.2 R, 32.8 EP, 260/47 EA, 33.8 EP, 33.6 EP, 2 EP

[56] References Cited
U.S. PATENT DOCUMENTS

| | | | |
|---|---|---|---|
| 3,293,267 | 12/1966 | McCrecken et al. | 260/2 EP |
| 3,296,202 | 1/1967 | Josten et al. | 260/47 EA |
| 3,634,396 | 1/1972 | Aubry et al. | 260/32.8 EP |

*Primary Examiner*—J. Ziegler

[57] ABSTRACT

A stable impregnating solution of 3,3',4,4'-benzhydrol tetracarboxylic dianhydride and a polyepoxide for preparing handleable, formable resin-impregnated reinforcing material and fully cured laminates. A substantially non-reacted solution of 3,3',4,4'-benzhydrol tetracarboxylic dianhydride and a diglycidyl ether of bisphenol A is obtained in acetone.

9 Claims, No Drawings

POLYEPOXY-3,3',4,4'-BENZHYDROL TETRACARBOXYLIC DIANHYDRIDE LAMINATING RESINS

This invention relates to reinforced laminates, which possess excellent chemical, physical and thermal properties. More particularly, this invention relates to the preparation of stable, substantially unreacted and carboxyl-free resin impregnating solutions for use in preparing reinforced laminates comprising 3,3',4,4'-benzhydrol tetracarboxylic dianhydride and a polyepoxide in a solvent.

The common dianhydrides are well known to be very difficulty soluble in common solvents. For example, such dianhydrides as cyclopentane dianhydride; pyromellitic dianhydride; 3,3',4,4'-benzophenone tetracarboxylic dianhydride; 5-phenyl-5-methylhexane tetracarboxylic dianhydride an the like are only very slightly soluble in acetone. This is exemplified in the disclosure of U.S. Pat. No. 3,297,727 in which a ketone such as acetone is used to dissolve impurities out of the relatively insoluble 3,3',4,4'-benzophenone tetracarboxylic dianhydride.

Notwithstanding the substantial insolubility of 3,3',4,4'-benzophene tetracarboxylic dianhydride in acetone, a method has been suggested for preparing an impregnating solution of this dianhydride and a polyepoxide for use in the preparation of reinforced laminates. This method involves the partial polymerization of the polyepoxide with the 3,3',4,4'-benzophenone tetracarboxylic dianhydride. This partial polymerization is carried out at conditions, such as an elevated temperature and the presence of a polymerization accelerator that will effect significant anhydride-epoxide reaction. By careful control, the copolymerization results in a product which is sufficiently reacted to dissolve in a solvent such as acetone at an elevated temperature but which is not overreacted to a partially gelled, non-impregnable composition. The presence in this composition of a polymerization accelerator gives the solution a relatively short shelf life of only several days.

The compound 3,3',4,4'-benzhydrol tetracarboxylic dianhydride is a diaryl dianhydride very similar in structure to 3,3',4,4'-benzophenone tetracarboxylic dianhydride. However, due to the reactive aliphatic hydroxyl group in the former compound, it possesses certain uniquely different reaction characteristics. Thus, U.S. Pat. No. 3,293,267 describes and illustrates the active self-condensation of 3,3',4,4'-benzhydrol tetracarboxylic dianhydride by anhydride-hydroxyl reaction to produce a useful homopolymer, having a free carboxyl group of each anhydridehydroxyl reaction. This self-esterification reaction of the 3,3',4,4'-benzhydrol tetracarboxylic dianhydride readily occurs when it is dissolved in a solvent but does not occur in the solid, undissolved state.

In view of the general insolubility of dianhydrides in common solvents and in recognition of the facile anhydridehydroxyl reactivity of 3,3',4,4'-benzhydrol tetracarboxylic dianhydride, it was believed that this particular diaryl dianhydride could not be successfully used in the preparation of stable impregnating solutions with a polyepoxide. It was believed that the 3,3',4,4'-benzhydrol tetracarboxylic dianhydride while in solution with the polyepoxide would readily self-esterify to homopolymer as described in U.S. Pat. No. 3,293,267. Not only would such homopolymerization reduce the cross-link density and resulting properties of the desired copolymer, but it would also result in free carboxyl groups actively available for copolymerization with the polyepoxide.

Unexpectedly, we have discovered a stable, substantially non-reacted and carboxyl-free, dianhydride-polyepoxide impregnating solution which has a very long shelf life. In accordance with our invention we have discovered that 3,3',4,4'-benzhydrol tetracarboxylic dianhydride can be dissolved in a solution of a polyepoxide and a suitable solvent without significant copolymerization of this dianhydride with the polyepoxide. And surprisingly, we have further discovered that the 3,3',4,4'-benzhydrol tetracarboxylic dianhydride in this polyepoxide solution will not self-esterify to the homopolymer. This resulting solution of this dianhydride, the polyepoxide and the solvent being substantially non-reacted, that is polymer-free, and substantially carboxyl-free, is stable and non-reacting at room temperature (20°-25° C.).

According to our invention we have discovered that this substantially polymer-free impregnating solution of 3,3',4,4'-benzyhdrol tetracarboxylic dianhydride and a polyepoxide in a solvent such as acetone can be obtained without critical control of conditions and in the absence of a polymerization accelerator. Further, the solution is obtained at a temperature below that which will result in partial polmerization of the dianhydride with the polyepoxide. According to our procedure for preparing the novel impregnating solution, powdered 3,3',4,4'-benzhydrol tetracarboxylic dianhydride is added to a solution of a polyepoxide dissolved in a suitable solvent and the mixture is gently heated to a moderate temperature, no greater than about 50° C., until solution is obtained. The resulting substantially unreacted solution of the 3,3',4,4°-benzhydrol tetracarboxylic dianhydride, the polyepoxide and the solvent is stable for an extended period at room temperature.

Prior to the impregnation of a reinforcing material such as individual pieces of fiber glass cloth, a suitable polymerization accelerator, such as a tertiary amine, can be dissolved in the impregnating solution to accelerate the final cross-linking reaction. This solution will readily wet and fully impregnate the glass cloth or other reinforcing material. Following the impregnation of the glass cloth, the solvent is driven from the individual lamina at a moderate temperature to form handleable, moldable prepreg. The prepreg can then be associated in layers to the desired thickness for final cure in a heated press mold to form the laminate. The resulting fully cured laminate possesses exceptional chemical, thermal and physical properties. If properly prepared, it will contain no significant property destroying voids, bubbles or other discontinuities in the resin phase.

The expression "prepreg" as used herein as well as used by workers in the fiber reinforced laminate art refers to impregnated reinforcing material which has been obtained by impregnating reinforcing material with a resin mixture and increasing the viscosity of the impregnated resin so that it is sufficiently non-tacky that it can be readily handled. The most universally used handleable, resin-impregnated, reinforcing material is glass fiber reinforced prepreg.

The expressions epoxy resin and polyepoxide are used interchangeably herein to refer to the broad class of initial epoxide containing reactants useful for preparing the impregnating solution of the laminating resin. The epoxy resin can be a single compound or a mixture of compounds containing the alpha-epoxy group and can be monomeric or polymeric and should be nonplasticizing in the formulation used. Each epoxy group can be located terminally, internally, or on a cyclic structure that is capable of being used in preparing a thermoset material. The expressions are used with reference to the thermoplastic or uncured state and do not refer to a thermoset or cured material. When the epoxy resin is a single compound, it must contain at least two epoxy or oxirane groups per molecule. However, with epoxy resins or polyepoxides in which a variety of molecular species are present such as in the reaction product of epichlorohydrin and bisphenol A, the number of epoxy groups will vary from molecular species to molecular species such that the average number of epoxy groups per molecule is specified.

This average number of epoxy groups per molecule is also designated the epoxy equivalent value. When a mixture of compounds is involved, the epoxy equivalent value must be greater than one and preferably at least about two but will generally not be a whole integer. The epoxy equivalent value is obtained by dividing the average molecular weight of the epoxy resin by its epoxide equivalent weight (grams of epoxy resin containing one gram equivalent of epoxide). The epoxy resin can be aliphatic, cycloaliphatic, aromatic, heterocyclic, mixtures of these, saturated or unsaturated, and can include noninterfering groups such as halogen, alkoxy, ether and the like.

This broad class of epoxy resins which is useful in forming the epoxy containing polymer is exemplified by reference to several of the better known types. Glycidyl group epoxy resins are an important type of epoxy resin. This includes the glycidyl ethers, the glycidyl esters, the glycidyl amines, the thioglycidyl resins, the silicon glycidyl resins and the like. The glycidyl ethers include the glycidyl ethers of mononuclear polyhydric phenols, polynuclear polyhydric phenols, and the like. They may be single compounds or more commonly are a mixture of compounds, some of which are polymeric in nature.

The glycidyl ethers of polyhydric phenols include the glycidyl ethers of bisphenol A; resorcinol; hydroquinone; catechol; pyrogallol; phloroglucinol; their methyl derivatives; and the like as well as the glycidyl ethers of polynuclear phenols such as 2,2-bis(4-hydroxyphenyl)-propane; bis(4-hydroxyphenyl)-methane; 2,2-bis(4-hydroxyphenyl)isobutane; 2,2-bis(2-hydroxynaphthyl)-pentane; 1,5-dihydroxynaphthalene; 4,4'-dihydroxybiphenyl; 2,3',4-tri(epoxytripropoxy)biphenyl; dihydroxyfluoroanthrene; dihydroxydinaphthylmethane and the like and glycidyl ethers of the novolac resins, such as bisphenol F, which are the reaction products of formaldehyde with phenol and substituted phenols.

The epoxy resins also include epoxidized cycloaliphatic compounds such as vinylcyclohexene dioxide; limonene dioxide; dicyclopentadiene dioxide; 3,4-epoxy-6-methylcyclohexylmethyl-4-epoxy-6-methylcyclohexane carboxylate; and the like; and also include epoxidized butadiene, epoxidized polybutadiene, and the like. They further include epoxy resins obtained from chloroacetyl compounds such as 4,4-bis(1,2-epoxyethyl)phenylether; 1,3,5(1,2-epoxyethyl)benzene; 1,5(1,2-epoxyethyl)-naphthalene; 4,4'-bis(1,2-epoxyethyl)biphenyl; and the like.

The commercially available glycidyl ethers of bisphenol A, the glycidyl ethers of the novolac resins and the cycloaliphatic polyepoxides are highly useful in making laminates having particularly desirable properties. Suitable glycidyl ethers of bisphenol A are available in the ERL series of Union Carbide Plastics Company, the Epon resins of Shell Chemical Company, and the D.E.R. series of Dow Chemical Company. Suitable glycidyl ethers of the novolac resins include D.E.N. 431 and D.E.N. 438 of Dow Chemical Company and Shell Chemical Company's Epon 152 and Epon 154. Suitable cycloaliphatic polyepoxides include ERL-4201 and ERL-4221 of Union Carbide Plastics Company. Other recommended polyepoxides are the nonplasticizing epoxy resins set out in Appendix 4-1 of HANDBOOK OF EPOXY RESINS by H. Lee and K. Neville, McGraw-Hill Book Company, 1967.

Although the 3,3',4,4'-benzhydrol tetracarboxylic dianhydride can be used alone as the anhydride hardener component in the impregnating solution, a mixed anhydride comprising both this diaryl dianhydride and also a monoanhydride component can be used to reduce the overall resin cost. Since the monoanhydride not only reduces the resin cost but also somewhat reduces the desired properties of the final laminate, the amount of monoanhydride that is used represents a balance of the criticality and value of the properties. The 3,3',4,4'-benzhydrol tetracarboxylic dianhydride can comprise from about 15 weight percent to 100 percent of the anhydride hardener and preferably about 25 percent to about 50 percent of the total anhydride with the remainder being the monoanhydride. Any monoanhydride will copolymerize in the reaction and can be used in combination with the diaryl dianhydride.

A monoanhydride that will result in the least reduction of physical properties in the resulting fully cured laminate is preferably selected. It is desired that the fully cured resin possess suitably high values in those properties particularly as determined by flexural strength test (ASTM 790-66), tensile strength test (ASTM 638-68) and heat distortion test (ASTM 648-61) as well as possess excellent solvent, chemical, and high temperature resistance. Monoanhydrides which tend to impart a plasticizing function into the cured resin are not used.

Desirable nonplasticizing monoanhydrides include maleic anhydride; succinic anhydride; and the one to six carbon alkyl, the chloro, the phenyl, the benzyl and the mono and dimethylbenzyl derivatives of maleic anhydride such as citraconic anhydride; itaconic anhydride; chloromaleic anhydride; methyl succinic anhydride; propylsuccinic anhydride, hexylsuccinic anhydride; phenylmaleic anhydride; $\alpha,\alpha$-dimethylbenzylsuccinic anhydride; and the like. Also desirable monoanhydrides include phthalic anhydride, tetrahydrophthalic anhydride, hexahydrophthalic anhydride, and their chloro, methyl and cyano derivatives, and the like, such as methyltrihydrophthalic anhydride; 1,2-dicarboxylic-4-chlorocyclohexane anhydride; 1,2-dicarboxylic-4-cyanocyclohexane anhydride; and the like. Further desirable monoanhydrides include 1,2-dicarboxyliccyclopentane; 1,2-dicarboxyliccycloheptane; and the three-ringed anhydrides formed by the Diels-Alder condensation of maleic anhydride with cyclopentene, furan, or their methyl derivatives, such as bicyclo(2.2.1-)heptene-2,3-dicarboxylic anhydride (Nadic anhydride); a mixture of methylbicyclo(2.2.1)heptene-2,3-dicarboxylic anhydride isomers (Nadic methyl anhydride); 7-oxabicyclo(2.2.1)heptene-2,3-dicarboxylic anhydride; and the like.

The amount of the anhydride component and the polyepoxide in the impregnating solution are so proportioned that the ratio of the chemical anhydride equivalents to the chemical epoxy equivalents of the epoxy resin (the A/E ratio) falls within the range between about 0.4 and about 1.0, and preferably between about 0.65 and about 0.85.

Acetone is the preferred solvent for preparing the novel impregnating solutions of our invention. The class of suitable solvents includes other low boiling compounds such as the lower alkyl ketones having up to five carbon atoms, exemplified by methyl ethyl ketone, methyl isopropyl ketone, methyl isobutyl ketone, and the like; lower alkyl canboxylic acid esters having up to five carbon atoms such as methyl acetate, ethyl acetate, isopropyl acetate, and the like; chlorinated hydrocarbons having one or two carbon atoms such as methylene chloride, chloroform, carbon tetrachloride, trichloroethylene, 1,1,1-trichloroethane; 1,1,2-trichloroethane; and the like, aromatic hydrocarbons having six or seven carbon atoms, such as benzene and toluene, and mixtures of any two or more of these low boiling compounds.

The low boiling solvent desirably possesses a boiling point no higher than about 110° C. It is used in an amount sufficient to dissolve the resin mixture and to provide a suitable fluidity or viscosity for impregnating the fibrous material. A viscosity under 10,000 centipoises, preferably under 5,000 centipoises, is the preferred solution viscosity for impregnation. The laminating solution is prepared with a total resin content of between about 15 and about 70 weight percent resin, and preferably between about 40 and about 60 weight percent resin.

In preparing the resin solution powdered 3,3',4,4'-benzhydrol tetracarboxylic dianhydride is desirably added to the already formed epoxy resin solution or less desirably the 3,3',4,4'-benzhydrol tetracarboxylic dianhydride and epoxy resin are concurrently added to the solvent. The addition of the 3,3',4,4'-benzhydrol tetracarboxylic dianhydride to the solvent prior to the epoxy resin is generally avoided to forestall the self-esterification reaction of the dianhydride described above. A gentle heating of the mixture to a moderate temperature no higher than about 50° C. will effect rapid solution of all components within a few minutes.

The cross-linking reaction of the 3,3',4,4'-benzhydrol tetracarboxylic dianhydride with the polyepoxide during the final cure occurs much more readily than the cross-linking reaction of any monoanhydride that may be present. With no monoanhydride present an anhydride-accelerator may be used but is not necessary to obtain a suitable cured laminate. However, with monoanhydride present, particularly if it comprises about 50 weight percent or more of the anhydride hardener component, a suitable anhydride-accelerator is used in order to obtain a laminate having the desired properties. This class of polymerization accelerators is well known and includes the tertiary amines such as benzyldimethylamine; benzyldiethylamine; diethylethanolamine, dimethylethanolamine; triethylamine; tripropylamine; tributylamine; pyridine, 2-picoline; 4-picoline; 2,6-lutidine; alpha-methylbenzyldimethylamine; dimethylaminopropylamine; dimethylaminomethyl phenol; tris(dimethylaminomethyl)phenol; and the like; as well as tin octanoate, $BF_3$.monoethylamine complex, and the like. The accelerator can be used in the range of about 0.5 to about 5.0 parts per hundred parts of resin (phr.) and preferably about 1.0 to about 3.0 phr.

When used, the anhydride accelerator is added to the resin solution prior to the impregnation of the reinforcing material. Following impregnation, the solvent is removed from the impregnated lamina at a temperature between about 50° and 120° C. for sufficient time for substantially complete removal of the solvent without causing an overcure of the prepreg. During the solvent removal, the resin mixture in the lamina concurrently thickens from the easily flowing, sticky material to a viscous handleable lamina or prepreg. The thickening of the resin to form the prepreg results from the combined effect of the evaporation of the low viscosity solvent and a partial cross-linking of the epoxy resin by the anhydride components. The overall properties of the prepreg are a function of the time and temperature of the solvent removal step, the nature of the anhydride and epoxy resin constituents and indirectly a function of the volatility of the solvent. The solvent is preferably substantially completely removed in this step to prevent solvent bubbling in the final cure. Also the resin mixture is partially cross-linked to form a handleable prepreg in the solvent removal step but is not cross-linked to a degree that would prevent adequate flow and interbonding with other lamina in the final cure of the laminate under heat and pressure. Therefore, the solvent must be selected for any specific resin formulation so that it can be substantially completely removed at the conditions of the prepreg formation stage without overcuring the prepreg in the solvent's removal. Between about 56° C. and about 80° C. are optimum for acetone removal. If the solvent has been removed under conditions that result in insufficient cross-linking of the epoxy resin, then it is a simple matter to continue the mild heating following the solvent removal until a satisfactory moldable, handleable prepreg is obtained.

The final laminate is made by stacking the individual laminas or prepregs to a desired thickness, generally to form a laminate of six to 12 lamina. The laminate is cured in a heated pressure mold under conditions of temperature and pressure that will cause the resin mixture to flow and completely wet the fibers and fully integrate with the adjacent layers prior to gelation. A unitary, substantially bubble-free and defect-free fully cured laminate is obtained when the various steps have been carried out under optimized conditions.

The curing conditions are not critical provided that a substantially fully cured integral and sound laminate is the result. The material can be conveniently cured at about 80° C. to about 200° C., preferably from about 90° C. to about 165° C. for about 10 minutes to about four hours or more, preferably from about 15 minutes to about two hours at a pressure of about 50 p.s.i. to aout 5,000 p.s.i., and preferably a pressure of about 150 p.s.i. to about 500 p.s.i. This can be followed by a post cure at a temperature between about 120° C. to about 220° C., preferably between about 150° C. to about 200° C. for up to 24 hours or longer. Post curing refers to the heating of the fully formed laminate at atmospheric pressure to enable substantially complete cross-linking by substantially all of the available active groups. It is also possible and sometimes preferred to utilize a stepwise cure, that is, heating at a specified temperature and pressure for a period of time followed by treatment at a second temperature and pressure for a succeeding period of time and then the post cure.

The fibrous reinforcing material can be in the form of a mat, wool, paper, woven fabric and the like and can be either of a synthetic fiber such as nylon, polyester, graphite, boron, glass, steel and the like; or a natural fiber such as asbestos, and the like; for example polyester wool, abestos paper, fiber glass cloth, would fiber glass filament, and the like.

Woven fiber glass in various grades and texture is well known and commercially available for producing resin-fiber glass compositions. A finish is generally applied to the fiber glass filaments by the manufacturer. It is preferred that the fiber glass filaments comprising the woven product have a coating or finish which is reactive under the curing conditions with at least one of the resin-forming components. The silane finishes are preferred because they are chemically bonded to the glass filaments and have free reactive groups available for reaction with the resin components. The final product will comprise from about 50 to about 90 weight percent of the fibrous material, preferably from about 60 to about 80 weight percent.

As pointed out, the advantages of the 3,3',4,4'-benzhydrol tetracarboxylic dianhydride cured epoxy resin laminate include excellent physical properties such as flexural strength and tensile strength, which can only result from the use of nonplasticizing epoxy resins and monoanhydrides. Since a plasticizer including a reactive plasticizing material also called an internal plasticizer, increases the softness, flexibility and distensibility of the fully cured product, a plasticizing material would tend to defeat the particular advantages inherent in the preferred laminate. Therefore, the plasticizing epoxy resins, such as epoxidized animal or vegetable oils, and the plasticizing monanhydride, such as dodencenyl succinic anhydride, are not used in preparing the laminates possessing the superior physical properties.

The following examples are set out to illustrate the invention and to provide a better understanding of its details and advantages.

EXAMPLE 1

A solution of 30 g. (0.160 epoxy equivalents) of Epon 828, and 70.8 cc. of acetone was prepared in a 250 cc. stirred, round bottom flask. To this solution was added 15.5 g. (0.0962 anhydride equivalents) of powdered 3,3',4,4'-benzhydrol tetracarboxylic dianhydride. The mixture was heated to about 50° C. and after several minutes at this temperature the dianhydride was completely dissolved. The A/E of the solution was 0.6 at a solids content of 45 percent. The solution was allowed to cool and 3.0 g. of benzyldimethylamine was added. Glass cloth was dip-impregnated with this solution and the acetone was vaporized from the impregnated cloth by heating at 80° C. for eight minutes to form prepreg. A stack of six of these prepreg lamina was placed in a hydraulic press and cured for 30 minutes at 165° C. and 500 p.s.i. (35.15 Kg./cm²). After removing the laminate from the press, it was post-cured for 16 hours at 200° C. The flexural strength (ASTM 790-66) of several samples was found to be an average of 72,070 p.s.i. (5,060 Kg./cm²) at a maximum variation of about six percent.

EXAMPLE 2

Another prepreg was made in the manner described in Example 1 using 50 g. of Epon 828 (0.267 epoxy equivalents), 119 cc. of acetone, 26 g. of 3,3',4,4'-benzhydrol tetracarboxylic dianhydride (0.160 anhydride equivalents) and 0.5 g. of benzyldimethylamine. The resin content of this solution was about 45 percent at an A/E ratio of 0.6. A 12-layer stack of the prepreg was cured as described in Example 1 forming a 12-ply laminate. The flexural strength of this laminate was found to be 81,480 p.s.i. (5,720 Kg./cm²).

EXAMPLE 3

A solution was made in the flask from 107 cc. of acetone, 15 g. of Nadic methyl anhydride (0.084 anhydride equivalents) 39.2 g. of Epon 828 (0.209 epoxy equivalents), 15 g. of 3,3',4,4'-benzhydrol tetracarboxylic dianhydride (0.093 anhydride equivalents) and 0.78 g. of benzyldimethylamine in the manner described in Example 1. The resulting solution had a resin content of 50 weight percent at an A/E ratio of 0.85. A six-ply laminate was prepared and cured at the conditions described in Example 1. The flexural strength of the resulting fully cured laminate was 65,000 p.s.i. (4,730 Kg./cm²).

The above examples are in striking contrast to the use of 3,3',4,4'-benzophenone tetracarboxylic dianhydride in the formulation of impregnating solutions as illustrated in the following examples.

EXAMPLE 4

A one-liter resin kettle fitted with a thermometer, stirrer and a reflux condenser was used. Into this vessel was charged 117.6 g. of Epon 828, 45 g. of Nadic methyl anhydride, 45 g. of powdered 3,3',4,4'-benzophenone tetracarboxylic dianhydride and 321 cc. of acetone. The A/E ratio of this cloudy solution was 0.85 with the acetone constituting 55 weight percent of the total formulation. This mixture was heated at reflux (56°–60° C.) for 30 hours, yet it remained cloudy. It was determined that the dianhydride was substantially undissolved.

EXAMPLE 5

The experiment of Example 4 was repeated except that 2.34 g. of benzyldimethylamine was added to the resin kettle together with the other components. This mixture was also heated to reflux temperature. After one hour the solution was almost clear and after two hours the solution was clear and it was determined that all of the dianhydride had gone into solution. The solution was cooled to room temperature with no precipitation occurring. This procedure involved a substantial reaction of the dianhydride with the epoxy resin to effect the complete solubility. The resulting solution had a useful shelf-size of less than two weeks.

It is to be understood that the above disclosure is by way of specific example and that numerous modifications and variations are available to those of ordinary skill in the art without departing from the true spirit and scope of the invention.

We claim:

1. A stable, substantially non-reacted and carboxyl-free resin solution for impregnating reinforcing material in the preparation of reinforced laminates comprising
    a nonplasticizing 1,2-epoxy resin which contains on the average more than one 1,2-epoxy group per molecule,
    sufficient anhydride hardener component for an A/E ratio of between about 0.4 and about 1.0, said anhydride hardener component comprising
        about 15 to 100 weight percent 3,3',4,4'-benzhydrol tetracarboxylic dianhydride and
        up to about 85 percent of a nonplasticizing monoanhydride, and
    from about 30 to about 85 weight percent of the total solution of a solvent having a boiling point no greater than about 110° C. selected from a lower alkyl ketone having up to five carbon atoms, a lower alkyl carboxylic acid ester having up to five carbon atoms, a chlorinated hydrocarbon having up to two carbon atoms, an aromatic hyrocarbon having up to seven carbon atoms, and mixtures thereof; said stable solution being at a temperature no higher than about 50° C.

2. An impregnating solution in accordance with claim 1 in which the epoxy resin contains an average of about two 1,2-epoxy groups per molecule.

3. An impregnating solution in accordance with claim 1 in which the A/E ratio is between about 0.65 and about 0.85.

4. An impregnating solution in accordance with claim 1 in which the anhydride hardener component comprises about 25 to about 50 weight percent of said dianhydride.

5. An impregnating solution in accordance with claim 1 in which the solvent comprises from about 40 to about 60 weight percent of the solution.

6. An impregnating solution in accordance with claim 1 in which the solvent is acetone and the monanhydride is a liquid at room temperature.

7. An impregnating solution in accordance with claim 1 in which the epoxy resin is a diglycidyl ether of bisphenol A.

8. The method for preparing a stable, substantially non-reacted and carboxyl-free resin solution for impregnating reinforcing material in the preparation of reinforced laminates comprising heating
   a nonplasticizing 1,2-epoxy resin which contains on the average more than one 1,2-epoxy group per molecule,
   sufficient anhydride hardener component for an A/E ratio of between about 0.4 and about 1.0,
     said anhydride hardener component comprising about 15 to 100 weight percent 3,3',4,4'-benzhydrol tetracarboxylic dianhydride and
     up to about 85 percent of a nonplasticizing monoanhydride, and
   from about 30 to about 85 weight percent of the total solution of a solvent having a boiling point no greater than about 110.20 C. selected from a lower alkyl ketone having up to five carbon atoms, a lower alkyl carboxylic acid ester having up to five carbon atoms, a chlorinated hydrocarbon having up to two carbon atoms, an aromatic hydrocarbon having up to seven carbon atoms, and mixtures thereof;
at a temperature no higher than about 50° C. until solution is obtained and then cooling said solution whereby a stable, substantially non-reacted and carboxyl-free resin solution is obtained.

9. The method for preparing a resin solution in accordance with claim 8 in which the solvent is acetone.

* * * * *

UNITED STATES PATENT AND TRADEMARK OFFICE
CERTIFICATE OF CORRECTION

PATENT NO. : 4,041,004
DATED : August 9, 1977
INVENTOR(S) : Walter P. Barie, Jr., Anatoli Onopchenko and Johann G. D. Schulz It is certified that error appears in the above–identified patent and that said Letters Patent are hereby corrected as shown below:

Col. 1, line 52, "of each" should read --for each--.

Col. 6, line 57, "enable" should read --ensure--.

Col. 7, line 1, "would" should read --wound--.

Col. 7, line 46, "3.0 g." should read --0.3 g.--.

Col. 10, line 15, (claim 8) "110.20 C." should read --110° C.--.

Signed and Sealed this

Twenty-second Day of November 1977

[SEAL]

Attest:

RUTH C. MASON
Attesting Officer

LUTRELLE F. PARKER
Acting Commissioner of Patents and Trademarks